T. H. JACOB.
WHEEL PULLER.
APPLICATION FILED MAR. 6, 1920.

1,367,744. Patented Feb. 8, 1921.

Inventor
Thomas H. Jacob

Witness
Robert Weber

By Young & Young,
Attorneys

UNITED STATES PATENT OFFICE.

THOMAS H. JACOB, OF WAUSAU, WISCONSIN.

WHEEL-PULLER.

1,367,744.

Specification of Letters Patent.

Patented Feb. 8, 1921.

Application filed March 6, 1920. Serial No. 363,805.

*To all whom it may concern:*

Be it known that I, THOMAS H. JACOB, a citizen of the United States, and resident of Wausau, in the county of Marathon and State of Wisconsin, have invented certain new and useful Improvements in Wheel-Pullers; and I do hereby declare that the following is a full, clear, and exact description thereof.

My invention refers to wheel pullers and it has for its object to provide a simple economical and durable tool of this type.

The invention particularly refers to wheel pullers used in connection with removing wheels from axles wherein the hubs of such wheels are threaded at their outer ends. Heretofore devices for extracting the wheels of this type, while more or less effective, are short lived due to the fact that they are clamped by means of bolts upon the hub and in practice it has been demonstrated that such structures frequently mar or destroy the thread hubs.

Bearing in mind the above referred to difficulties the problem which I have solved is to provide a tool that will extract the wheel without marring the threads thereon, which function I attain by the application of a shell having a threaded sleeve therein for attachment to the threaded portion of a hub and thereafter an extractor plunger carried by the sleeve is arranged to exert end thrust upon the axle to quickly remove the wheel hub without damaging any of the parts thereof.

With the above and other minor objects in view the invention consists in certain peculiarities of construction, combination and arrangement of parts which are herein set forth with reference to the accompanying drawing and subsequently briefed in the claims.

Figure 1:
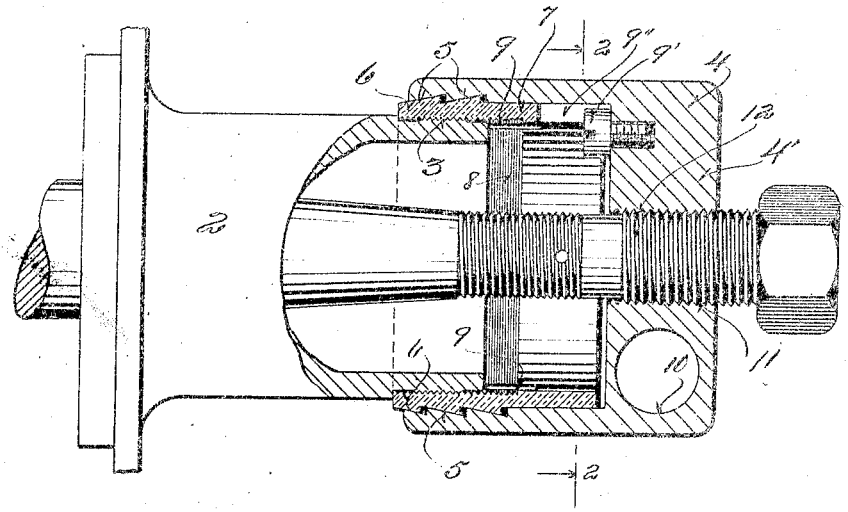
Figure 1 represents a side elevation of a hub and axle equipped with a wheel extractor embodying the features of my invention, the extractor mechanism and portion of the wheel hub being in section as indicated by the line 1—1 of Fig. 2.
Figure 2:
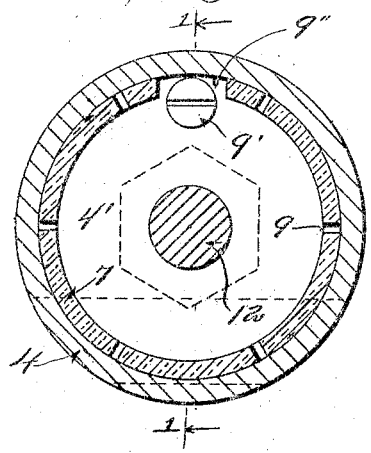
Fig. 2 is a cross section of the same the section being indicated by the line 2—2 of Fig. 1.

Referring by character to the drawings, 1 represents the tapered end of an axle having mounted thereon a wheel hub 2, which wheel hub is threaded exteriorly at its outer end as indicated by the reference character 3. Mounted upon the outer end of the wheel hub is an extractor or puller comprising an outer shell 4 the inner open end of which is provided with coarse saw tooth threads 5, the bevel of which threads is inclined inwardly and toward the hub axis.

The saw tooth threads are adapted to receive the correspondingly threaded end 6 of a sleeve 7, which sleeve is provided with internal fine threads 8 at its outer end for engagement with the hub threads 3.

In order to provide for compressibility of the sleeve its outer end is provided with slots 9 that extend a predetermined distance through the body of the sleeve from the inner end thereof whereby flexure is attained.

In assembling the parts of the wheel puller the sleeve 7 is first nested into the rigid shell 4 by revolving the sleeve so as to form the threaded union between the saw tooth exterior threads of said sleeve and the corresponding interior threads of the shell.

Figure 3:
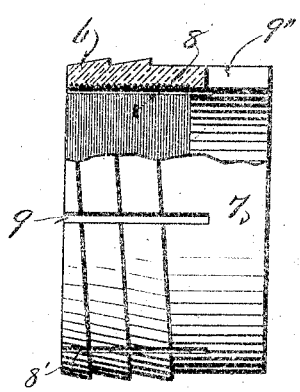
Fig. 3 is a detail elevation of a sleeve element embodying one of the features of the wheel extractor, the sleeve being partly broken away and in section to more clearly illustrate certain structural features.

When the parts are so assembled they are held against relative rotation by the insertion of a headed bolt 9' which is in threaded union with the outer closed end of the shell and the head of this bolt is adapted to enter a slotted recess 9" that is formed in the inner end of the sleeve as best shown in Figs. 1 and 3. Thus it will be seen that after the bolt is put in place rotary movement of the sleeve will be impossible as the bolt 9 serves as a key.

The closed head 4' of the shell is formed with a transversely disposed bar receiving aperture 10 and the central portion of said head is provided with a screw threaded aperture for the reception of a plunger 12, which plunger in this instance is in the form of a threaded bolt having a polygonal head. From the foregoing description it will be seen that in order to insert the wheel puller about the hub of the wheel the operator fits a bar or other lever through the shell aperture 10 whereby power may be applied to the shell so as to revolve it together with the sleeve, causing said sleeve to effect a threading engagement between it and the hub end. The plunger bolt 12 is then revolved in connection with its threaded union with the shell whereby the end of said plunger is caused to engage the end of the axle 1 and thus exert an end thrust or pulling strain upon the shell member together with the sleeve. Referring to Fig. 1 this movement will cause a slight slippage longitudinally relative to the threaded connection 5 and 6 between the sleeve and shell due to the inclined faces of the coarse threads and will cause the sleeve to compress or snugly hug the end of the hub 2 so as to prevent any tendency of stripping or marring the threads 3 of said hub. At the same time that this compression of the sleeve occurs the end thrust of the plunger will cause the wheel to be pulled clear of its engagement with the axle; thereafter the wheel puller is removed from the hub and the operation is repeated.

Obviously the structural details of the apparatus as a whole may be varied to accomplish the same example; other means for revolving the shell may be employed as a substitute for the bar mentioned and also other camming actions may be employed for accomplishing the end thrust as a substitute for the bolt 12.

I claim:

1. A wheel puller adapted to be fitted to the threaded outer end of a wheel hub that is mounted upon an axle, comprising an internally threaded shell, an exteriorly threaded sleeve in union with the shell threads, the sleeve being provided with internal threads adapted to engage the wheel hub threads, and an extractor plug carried by the shell for engagement with the wheel axle.

2. A wheel puller adapted to be fitted to the threaded outer end of a wheel hub that is mounted upon an axle, comprising a saw tooth exteriorly threaded shell, a corresponding threaded sleeve engageable with the shell threads the sleeve being internally threaded and adapted to engage the wheel hub threads, means for preventing relative rotation of the hub and shell, and an extractor plunger in threaded union with the shell for engagement with the wheel axle.

3. A wheel puller comprising a shell, a compressible sleeve carried by the shell, means associated with the sleeve and shell whereby the said sleeve is compressed incidental to longitudinal movement of the shell, and an extractor plunger carried by the shell adapted to impinge against a wheel axle to cause longitudinal movement of the shell and sleeve and means for preventing relative rotation of the aforesaid hub and shell.

In testimony that I claim the foregoing I have hereunto set my hand at Milwaukee, in the county of Milwaukee and State of Wisconsin.

THOMAS H. JACOB.